(No Model.)
J. MALLON.
COMBINATION SUBSOIL AND TURNING PLOW.
No. 532,677. Patented Jan. 15, 1895.
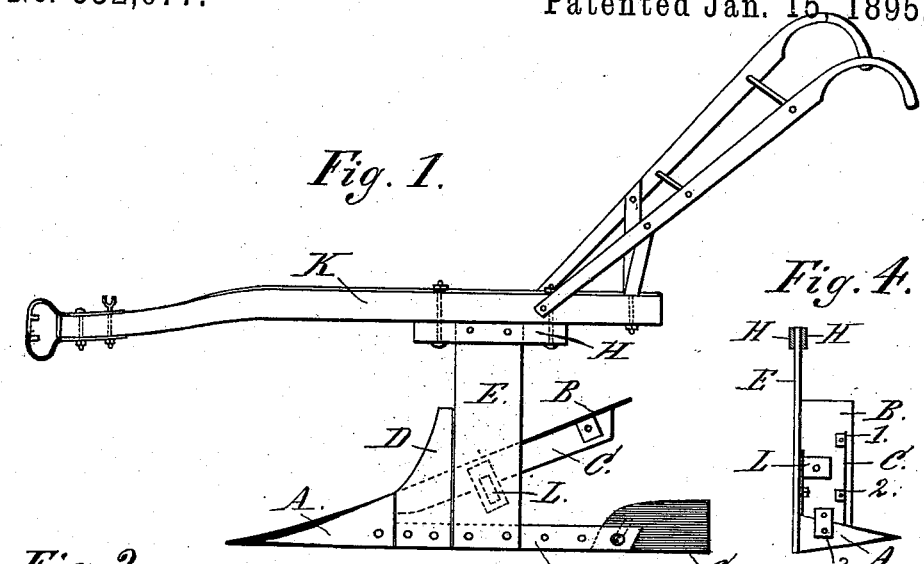
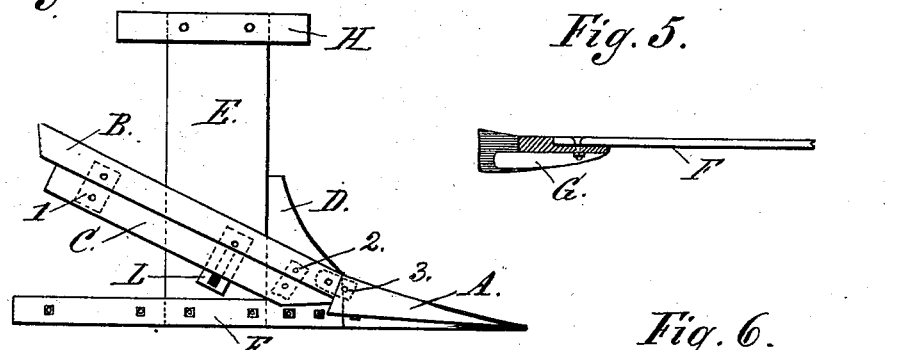
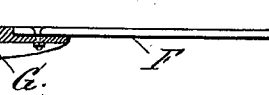
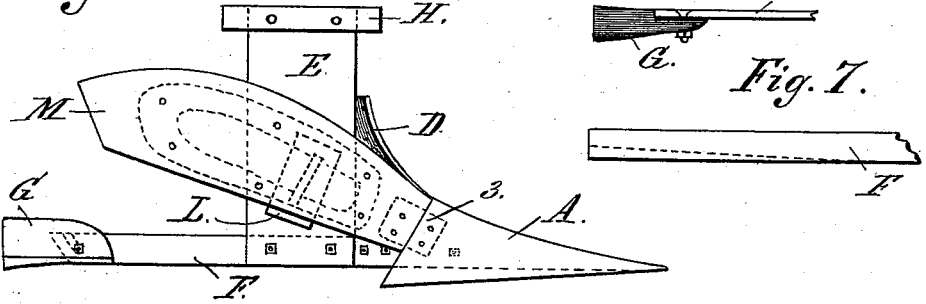
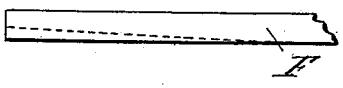
WITNESSES:
Helmuth Holtz
Ricardo Dee
INVENTOR
James Mallon.
by W. R. Stringfellow
ATTORNEY
THE NORRIS PETERS CO., PHOTO-LITHO., WASHINGTON, D. C.

United States Patent Office.

JAMES MALLON, OF NEW ORLEANS, LOUISIANA.

COMBINATION SUBSOIL AND TURNING PLOW.

SPECIFICATION forming part of Letters Patent No. 532,677, dated January 15, 1895.

Application filed August 1, 1892. Renewed June 8, 1894. Serial No. 513,966. (No model.)

*To all whom it may concern:*

Be it known that I, JAMES MALLON, a citizen of the United States, residing at New Orleans, in the parish of Orleans and State of Louisiana, have invented certain new and useful Improvements in a Combination Subsoil and Turning Plow; and I do declare the following to be a full, clear, and exact description of the invention, such as will enable others skilled in the art to which it appertains to make and use the same.

My invention relates to an improvement in a combination subsoil and turning plow, and its novelty will be fully understood when taken in connection with the annexed drawings. It is an improvement upon the device for which Letters Patent were granted to me on the 6th day of June, 1891, and numbered 453,887.

The objects of my invention are to provide an attachment to a plow that will prevent a vacuum being created and reduce motor or pulling power for working a plow, and at the same time enable adjustable mold boards and a heel to land side to be used. I attain these objects by the mechanism illustrated in the accompanying drawings, in which—

Figure 1 is a land side view of subsoil plow. Fig. 2 is a side view showing mold board. Fig. 3 is a combination side view of mold board. Fig. 4 is a rear view. Fig. 5 is a top view of plow bar or land side and adjustable heel. Fig. 6 is a bottom view of land side and adjustable heel. Fig. 7 is an ordinary bar or land side, dotted lines showing where same is worn off.

Similar letters and figures refer to similar parts throughout the several views.

In the drawings A refers to a plow point which may be of any desired construction.

B is a mold board which is attached to a fender C,—said fender being so constructed that it prevents the earth from dropping under mold board and causing a vacuum.

D is a cutter which is adjustable and rests against standard E. Said cutter may be removed and sharpened, or sharpened when in position.

F is a land side provided with an adjustable heel G, which enables a steady movement to be given plow when in use and is preferably constructed of chilled or hard metal.

H is a cap for attaching standard E to beam K.

L is a clamp for holding mold board.

M is a turning mold board and is connected to plow point A by means of brace 3.

1 and 2 are braces for holding fender to mold board.

The mode of operation is the same as an ordinary plow, except that when the point A has been inserted in the earth and the loose soil raised by means of the pressure of the air circulating through the concave opening on the outer side, the resistance is reduced fully fifty per cent., and by means of my fender C, I am enabled to adjust any form of mold board. An additional advantage is the adjustable heel which is attached to the land side, as heretofore when plows have been used for some time the land side becomes worn as shown by dotted lines in Fig. 7, and when thus worn the movement of the plow is not steady when in use. The cutter D placed in the position shown enables it to render more effective service.

Having described my invention, what I claim, and desire to secure by Letters Patent, is—

In a plow, such as described, the combination with the standard, a fender C, clamp L for attaching mold board, cutter D, and an adjustable heel for a land side, as set forth.

In testimony whereof I affix my signature in presence of two witnesses.

JAMES MALLON.

Witnesses:
RICARDO DEE,
WILLIAM WILSON.